US007263656B2

(12) United States Patent
Ruellan et al.

(10) Patent No.: US 7,263,656 B2
(45) Date of Patent: Aug. 28, 2007

(54) METHOD AND DEVICE FOR SCHEDULING, GENERATING AND PROCESSING A DOCUMENT COMPRISING BLOCKS OF INFORMATION

(75) Inventors: Herve Ruellan, Rennes (FR); Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 10/190,526

(22) Filed: Jul. 9, 2002

(65) Prior Publication Data
US 2003/0088607 A1    May 8, 2003

(30) Foreign Application Priority Data

Jul. 16, 2001  (FR)  .................................. 01 09468
Jul. 16, 2001  (FR)  .................................. 01 09470

(51) Int. Cl.
*G06F 15/00* (2006.01)

(52) U.S. Cl. ........................................ 715/530; 715/513

(58) Field of Classification Search ................ 715/530, 715/513, 501.1, 500; 709/206, 207
See application file for complete search history.

(56) References Cited

U.S. PATENT DOCUMENTS

| 5,920,860 | A |  | 7/1999 | Maheshwari et al. ........... 707/5 |
| 6,122,708 | A |  | 9/2000 | Faraboschi et al. ......... 711/118 |
| 6,430,624 | B1 | * | 8/2002 | Jamtgaard et al. .......... 709/246 |
| 2002/0143871 | A1 | * | 10/2002 | Meyer et al. ................ 709/204 |
| 2003/0014733 | A1 | * | 1/2003 | Ringseth et al. ............. 717/116 |
| 2003/0095555 | A1 | * | 5/2003 | McNamara et al. ........ 370/401 |
| 2004/0268241 | A1 | * | 12/2004 | Laymen et al. ............. 715/513 |
| 2005/0172053 | A1 | * | 8/2005 | James et al. .................. 710/36 |

FOREIGN PATENT DOCUMENTS

| JP | 11-134273 | 5/1999 |
| WO | WO 00/42531 | 7/2000 |

OTHER PUBLICATIONS

Apparao, V., et al., "XML Protocol (XMLP) Requirements" W3C Working Draft, Mar. 19, 2001, pp. 1-16.
Gudgin, M., et al., "SOAP Version 1.2—W3C Working Draft," Internet Document, Jul. 9, 2001, pp. 1-49.
Nottingham, M., "Re: xp requirement document specifies headers," XML—Dist.—APP@W3.org Mail Archives—XML Protocol Working Group Forum, Jan. 23, 2001.
Clark, J., "XSL Transformations (XSLT)—Version 1.1", W3C Working Draft, Dec. 12, 2000, pp. 1-53.
"Parameterized SXL Style Sheets", Research Disclosure, Kenneth Mason Publications, Hampshire, Great Britain, No. 423, Jul. 1999, pp. 1009-1011.
Cooper, I., et al., "PDA Web Browsers: Implementation Issues", University of Kent Computing Laboratory Technical Report, Nov. 9, 1995, pp. 1-12.
U.S. Appl. No. 09/816,445, filed Mar. 26, 2001.

* cited by examiner

*Primary Examiner*—Stephen Hong
*Assistant Examiner*—Thu V. Huynh
(74) *Attorney, Agent, or Firm*—Fitzpatrick, Cella, Harper & Scinto

(57) ABSTRACT

A method is provided for scheduling a document that includes juxtaposed information blocks. The method includes dividing the information blocks into two groups, a first group of which includes information blocks that can be processed on the fly, and a second group of which includes information blocks not in the first group. The method also includes of inserting the second group of information blocks in the document, inserting a signaling block in the document, and inserting the first group of information blocks in the document after the signaling block. The method is especially useful in optimizing the on-the-fly processing an XML document.

23 Claims, 8 Drawing Sheets

METHOD AND DEVICE FOR SCHEDULING, GENERATING AND PROCESSING A DOCUMENT COMPRISING BLOCKS OF INFORMATION

The present invention relates to a method of processing a document comprising blocks of information.

It also relates to a method for scheduling such a document before processing and a method for generating such a document.

It correspondingly relates to a scheduling device, a generation device and a processing device which are adapted respectively for implementing the scheduling and processing methods in accordance with the invention.

It also relates to a method of creating a document comprising juxtaposed information blocks.

In general terms, this invention applies to communications networks in which the exchanges between computers and other devices communicating with the network are implemented by means of transfer of documents represented in a markup language of the extensible Markup Language (XML) type.

The XML language is a markup language, that is to say a language which presents information framed by tags.

It is defined through a W3C standard. The latter defines both the structure of the document represented in XML language and rules for processing this document.

Thus, in the SOAP standard defined by the W3C standard, a document in XML language is regarded as a document comprising juxtaposed blocks of information.

A detailed description of this SOAP standard can be consulted on the Internet.

Each information block in the XML language is defined between an opening tag and a closing tag, the information blocks thus being juxtaposed one after the other in the document, or nested inside one another.

Upon reception of a document, and especially when this document is relatively long, it is useful for the processing device to be able to process this document as it is being received, without having the whole of the document in memory at a given instant.

This aspect is all the more important for small-sized processing devices, such as a mobile telephone or a personal digital assistant, having a limited memory capacity.

Throughout the rest of this description, processing of a document on the fly is understood to mean a processing of this document which can be carried out as of the data constituting this document is being received, without having to store the whole of the document. This processing of the document on the fly is also called processing on the spot or streaming processing of the document.

However, the rules for processing a document may prohibit the option of this processing on the fly.

Thus, some of the information blocks may be marked by a particular attribute indicating that this block must mandatorily be processed during the processing of the document. Thus, the processing device should be configured to understand this information block marked with the particular attribute in order to be able to process the document as a whole.

Moreover, the SOAP standard specifies that the document processing device must actually understand all the blocks marked with this particular attribute before being able to start the processing of the document. This rule also requires the processing device to carry out a reading of the whole of the document before starting the processing of it, in order to verify its capability to be able to process all the blocks of information which are marked with the specific attribute. The processing device therefore has to be able to store the whole of the document in memory in order to carry out this first verification.

These rules for processing an XML document require that processing devices have a memory capacity sufficient for storing the whole of a document.

Furthermore, the first reading of the whole of the document, before the processing thereof, is costly in terms of time for processing this document.

Furthermore, it often happens that, in an XML document, certain information blocks reference one or more other information blocks, which are possibly placed before or after it in the document.

In this case, it may also be necessary to store certain information blocks in memory in order to allow the processing of subsequent information blocks of the document.

The object of the present invention is to resolve the abovementioned drawbacks and to allow processing on the fly of at least a part of a document comprising blocks of information.

To that end, the present invention, in a first aspect, envisages a method of scheduling of a document comprising juxtaposed blocks of information.

According to the invention, this scheduling method comprises the following steps:
 dividing the information blocks into two groups,
  a first group comprising information blocks that can be processed on the fly; and
  a second group comprising the information blocks of said document not in said first group;
 inserting the second group of information blocks;
 inserting a signaling block; and
 inserting the first group of information blocks after said signaling block.

The scheduling method thus makes it possible automatically to separate the information blocks which are suitable for being processed on the fly from the other information blocks.

By virtue of the incorporation of a signaling block, placed before the information blocks suitable for being processed on the fly, it is possible to indicate to a processing device the presence of such blocks, not requiring these blocks to be stored in memory in order to process them.

This scheduling method thus makes it possible to reduce the part of the document having to be processed globally, and thus necessarily being stored in memory, and makes it possible to allow processing of at least a part of it on the fly.

According to one preferred characteristic of this first aspect of the invention, the dividing step includes the following sub-steps:
 identifying at least one information block associated with a predetermined attribute, said predetermined attribute indicating the mandatory processing of the information block at the moment of the processing of said document; and
 writing said identified information block into said second group.

By virtue of this scheduling method, all the information blocks associated with a predetermined attribute, indicating the mandatory processing of these information blocks, are placed at the head of the document in such a way that the processing device can verify its capacity to process this type of information block as from reception of the start of the document, until the identification of the marking block.

According to an advantageous characteristic of this first aspect of the invention, the dividing step includes the following sub-steps:

identifying a first information block referencing a second information block; and writing the first information block into said second group if the second information block belongs to said second group.

Thus there are grouped together into the second group of information blocks, which is placed at the header of the document, all the information blocks referencing an information block placed in this second group.

Alternatively, the dividing step of the scheduling method in accordance with the first aspect of the invention includes the following sub-steps:

identifying a first information block referencing a second information block; and writing the first information block before the second information block if the second information block belongs to said first group.

Here, the first information block referencing the second information block is placed before this second information block in such a way that the processing of the document can be carried out on the fly as the information blocks are being received.

According to a second aspect of the invention, a method for processing a document comprising juxtaposed information blocks comprises the following steps:

identifying a predefined signaling block; and processing, on the fly, the information blocks inserted after said predefined signaling block.

Thus, the processing method allows on-the-fly processing of part of a document as from the identification of a signaling block incorporated during the scheduling of the document as described above.

The present invention correspondingly relates to a device for scheduling a document comprising juxtaposed information blocks, comprising:

means for dividing information blocks into two groups,
  a first group comprising information blocks that can be processed on the fly; and
  a second group comprising the information blocks of said document not in said first group;

means for inserting the second group of information blocks;

means for inserting a signaling block; and means for inserting the first group of information blocks after said signaling block.

It also relates to a device for processing a document comprising juxtaposed information blocks, comprising:

means for identifying a predefined signaling block; and processing means configured to process, on the fly, information blocks inserted after said predefined signaling block.

These scheduling and processing devices exhibit advantages and characteristics similar to those of the methods which they implement.

According to another aspect of the invention, a method of creating a document that can be processed on the fly, where the document comprises juxtaposed information blocks, comprising the step of:

dividing the information blocks into a first group containing the information blocks that can be processed on the fly and a second group containing the information blocks not in said first group;

inserting at least one block from said second group into the document;

inserting a signaling block into the document after said one block from said second group; and inserting at least one block from said first group after the signaling block.

According to another aspect of the invention, a computer document comprising juxtaposed blocks of information, comprises a signaling block, the information blocks inserted after said signaling block being able to be processed on the spot.

The present invention also relates, in a third aspect, to a method of generating a document adapted to be represented in the form of information blocks.

According to this third aspect of the invention, the generation method comprises the following steps:

identifying at least one reference associated with an information block, said reference being associated with a marker indicating that it is mandatory to process said information block during processing of the document;

creating an additional information block comprising a list of identified references; and writing, at the beginning of the document, the additional information block, and the information blocks of the document after said additional information block.

The method of generating such a document thus makes it possible to identify, at the beginning of the document, all the information blocks it is mandatory to process during processing of the document.

Thus, the processing device can check it is capable of processing all the information blocks of the document simply by reading the first additional information block, without having to analyze the whole document first. The processing of such a document is therefore faster.

Furthermore, once this additional information block has been analyzed, all the information blocks of the document placed after this additional information block can be processed as the document is being received by the processing device.

According to a preferred characteristic of the third aspect of the invention, the identification step is implemented on an XML schema adapted to define the structure of an XML document.

Thus, during the generation of an XML document from an XML schema, it is possible to identify the information blocks associated with a predetermined marker directly in the XML schema, independently of the data and information incorporated subsequently in the generated document.

According to another advantageous characteristic of the third aspect of the invention, at the step of creating an additional information block, the references in the list consist of names of tags associated with the information blocks.

The information blocks included between an opening tag and a closing tag can thus be identified relatively simply by the actual name of this tag, when the document is represented in a markup language.

According to a fourth aspect of the invention, a method of processing a document comprising a first information block comprising a list of references of information blocks associated with a predetermined marker, and successive information blocks, comprises the following steps:

reading the first information block; and checking, for each reference in said list, that the processing device is adapted to process the referenced information block.

Thus, checking that the processing method is capable of processing all the information blocks can be achieved simply by reading and analyzing the first information block, without requiring a complete reading of the document to be processed.

According to a preferred characteristic of this processing method, if the processing device is adapted to process all the information blocks associated respectively with references in the list, the method has a step of processing the information blocks of the document written after the first information block.

The information blocks of the document can thus be processed on the fly as soon as the first information block has been processed first.

According to another aspect of the invention, a document represented in a markup language, comprising information blocks defined between an opening tag and a closing tag, has an additional information block comprising a list of references of information blocks of said document, these referenced information blocks being associated with a marker indicating that it is mandatory to process the information block during processing of the document.

Such a document can be processed on the fly by a processing device, as soon as the additional information block has actually been processed by the processing device.

According to an advantageous characteristic of the invention, the additional information block is placed at the beginning of the document.

The whole of the document can thus be processed as it is being received, as soon as the additional information block has been processed in the first place by the processing device.

Correlatively, the present invention relates to a device for generating a document adapted to be represented in the form of information blocks.

According to the invention, the generation device comprises:
- means for identifying at least one reference associated with an information block, said reference being associated with a marker indicating that it is mandatory to process said information block during processing of the document;
- creation means adapted to create an additional information block comprising a list of identified references; and
- writing means adapted to write, on the one hand, the additional information block at the beginning of the document and, on the other hand, information blocks of the document after said additional information block.

It also relates to a device for processing a document comprising a first information block comprising a list of references of information blocks associated with a predetermined marker, and successive information blocks.

This document processing device comprises:
- means for reading the first information block; and
- means for checking, for each reference in the list, that the processing device is adapted to process the referenced information block.

These generation and processing devices have advantages and characteristics similar to those of the methods implemented by them.

The present invention applies in particular to any document represented in XML language.

It also relates to a mobile telephone, a personal digital assistant and, more generally, any computer system including a scheduling device and/or a processing device in accordance with the invention.

It also relates to an information medium, possibly wholly or partly removable, which can be read by a computer system, containing instructions of a computer program able to implement a scheduling method, and/or a generation method and/or a processing methods in accordance with the invention, when this program is loaded and run by computer system.

Finally, it envisages a computer program stored on an information medium, the program including instructions suitable for implementing a scheduling method and/or a generation method and/or a processing methods in accordance with the invention, when it is loaded and run by a computer system.

This mobile telephone, this personal digital assistant, this computer system, this information medium and this computer program exhibit characteristics and advantages similar to the methods which they implement.

Other features and advantages of the invention will emerge further from the description below.

In the attached drawings, given by way of non-limiting examples:

A method of scheduling a document in accordance with one embodiment of the first aspect of the invention will first of all be described by reference to FIG. 1.

Figure 2:
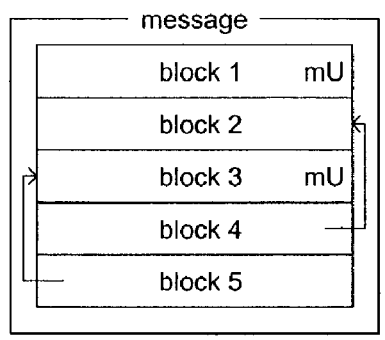
FIGS. 2 to 5 are diagrammatic representations of an example document represented in a markup language, illustrating the scheduling of the document upon implementation of the scheduling method of FIG. 1.

A document in XML language, as represented diagrammatically in FIG. 2, will be considered here, in a manner which is not in any way limiting.

This document comprises several juxtaposed information blocks, here five information blocks.

In XML language, each information block is bounded by an opening tag and a closing tag and comprises a certain number of text data items.

Needless to say, each block of the document may also include children tags, and may do so recursively.

Here, the blocks in question are all situated at the same hierarchical level of the XML document, in such a way that they are juxtaposed, with no possible overlap between the various blocks.

Each opening tag of an information block of the document may also comprise an attribute making it possible to qualify this tag.

In particular, the blocks 1 and 3 are associated here with a predetermined attribute, suitable for indicating to a processing device that the understanding and processing of these information blocks 1 and 3 are mandatory during the processing of the document.

In XML language, such an attribute is called "mustUnderstand", denoted in the remainder of this description as mU for short.

When this attribute is associated with the value "true", the device for processing the document must actually be capable of processing this information block, denoted mU block.

Furthermore, the SOAP standard dictates that the processing device can process the other blocks of the document only if it is suitable for processing all the blocks associated with the attribute mU.

Moreover, a document in XML language may also include information blocks referencing other information blocks.

By way of example, the block 4 references the block 2, while the block 5 references the block 3.

The first block references a second block when the processing of the first block requires all or part of the data from the second block.

This is the case especially with a signature block of a digital image, which requires the data representative of the image which are stored in another block in order to calculate the signature.

The document, as illustrated in FIG. 2, may constitute a message, generated on a server station or a computer of a communications network. This message will then be transferred to a processing device incorporated, for example, in another computer of the communications network, or else in a mobile telephone or a personal digital assistant, with a view to processing of it.

Figure 1:
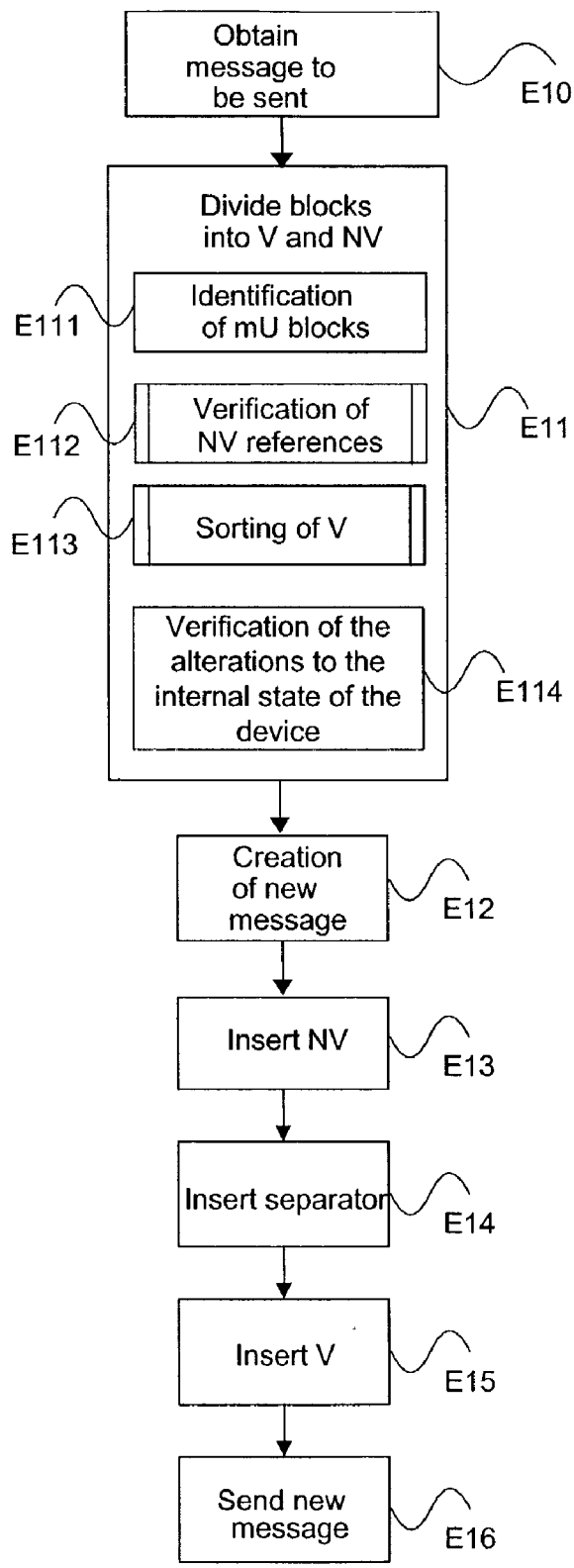
FIG. 1 is an algorithm illustrating the scheduling method in accordance with one embodiment of the first aspect of the invention.

As illustrated in FIG. 1, the first step E10 of obtaining the message to be sent is implemented on a server computer of the communications network.

The message, as illustrated in FIG. 2, is thus generated directly by the server computer of the network or else is recovered via the communications network from another computer.

Next, in accordance with the invention, the scheduling method first of all includes a step E11 of distributing information blocks into two groups.

This distribution step E11 makes it possible to store, in a first group, information blocks which are suitable for being processed on the fly, or else on the spot, as soon as they are received by the processing device.

The second group comprises the other information blocks of the document, that is to say the information blocks which cannot be processed on the fly as they arrive, but require at least one other information block to be held in memory in order to process them.

In the remainder of the description, the first group comprising information blocks suitable for being processed on the fly will be called group V and the second group, comprising the other information blocks, will be called group NV.

Here, in this preferred embodiment, the distribution step E11 first of all comprises a step E111 for the identification of the blocks on the basis of the previously described attribute mU.

In practice, each information block of the message is examined, and the information blocks associated with an attribute mU are identified.

For each information block of the message, the opening tag defining the start of the information block is read.

It is verified whether the attribute "mustUnderstand" exists and whether it is associated with a value "true".

Thus the blocks of the message which are associated with an attribute mU the value of which is "true" are identified.

Here, the blocks 1 and 3 of the message are identified, as illustrated in FIG. 2.

These information blocks 1 and 3 thus identified are then written into the second group NV.

Figure 3:
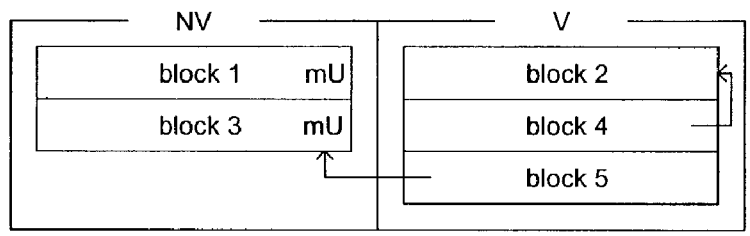

FIG. 3 illustrates this distribution of the information blocks of the message of FIG. 2 on completion of step E111.

A verification step E112 is then implemented and makes it possible to verify the references existing within the message to information blocks of the group NV.

Figure 1A:
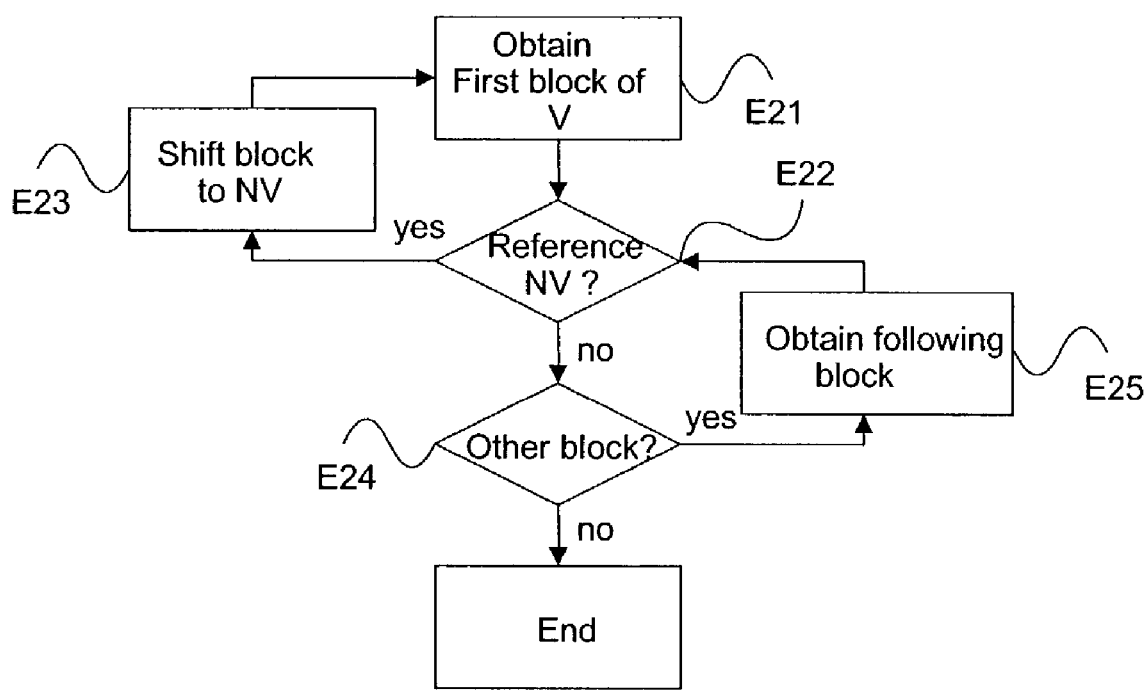
FIG. 1A is an algorithm illustrating a verification step of the scheduling method of FIG. 1.

This verification step E112 is illustrated in detail in FIG. 1A.

In practice, a first information block referencing a second information block is identified.

For example, the block 5 referencing the block 3 and the block 4 referencing the block 2 are identified here.

If the second information block belongs to the second group NV, the first information block is written into this second group NV.

Figure 4:
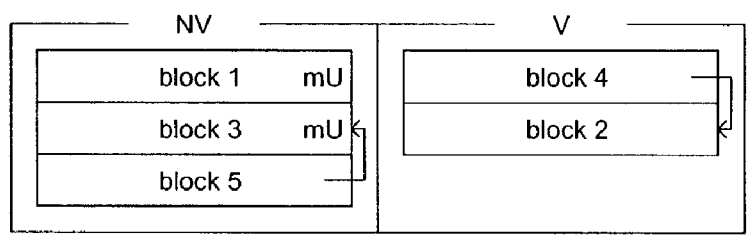

This is the case here with the information block 5 which references the information block 3 belonging to the second group NV. This information block 5 is written into the second group NV following the information blocks 1 and 3, as illustrated in FIG. 4.

As illustrated in FIG. 1A, this verification step is implemented on all of the information blocks stored in the first group V on completion of the identification step E111.

An obtaining step E1 makes it possible to obtain the first information block of the first group V.

A test step E22 makes it possible to verify whether this first block references a block stored in the second group NV.

If yes, a shifting step E22 makes it possible to shift the current information block into the second group NV.

After this shifting step E23, the step E21 of obtaining the first block of the group V is reiterated so as to reiterate the whole of the verification algorithm whenever the second group NV has been modified by the addition of a supplementary block.

If, on completion of this test step E22, the first block does not reference a block stored in the second group NV, it is verified, in a test step E24, whether another block exists in the first group V.

If yes, an obtaining step E25 makes it possible to obtain the following block stored in the first group V and steps E22 to E25 are reiterated for this following block.

When all the blocks of the group V have been verified, the verification step E112 terminates with a negative response on completion of the test step E24.

After this verification step E112, a sorting step E113 is also implemented on all the information blocks of the first group V.

Figure 1B:
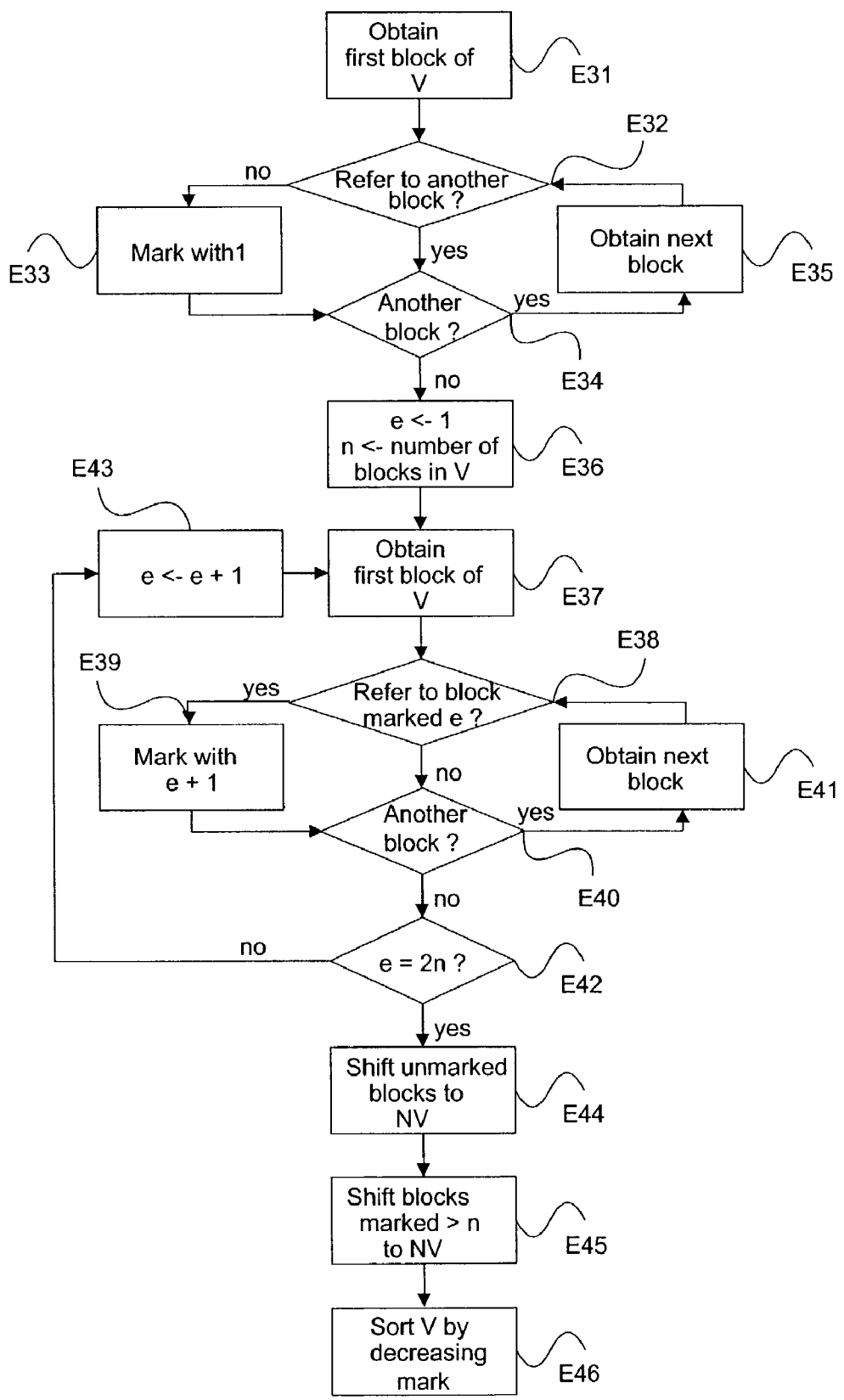
FIG. 1B is an algorithm illustrating a sorting step of the scheduling method of FIG. 1.

This sorting step E113 is illustrated in detail in FIG. 1B.

In particular, when a first information block is identified referencing a second information block in the first group V, this first information block is written before the second block in this first group V.

Here, the block 4 referencing the block 2 is placed before the block 2 as illustrated in FIG. 4.

During this sorting step E113, if at least two information blocks referencing one another directly or indirectly are identified, these information blocks are written into the second group NV.

Such a case can occur in particular when reference cycles are detected, that is to say, for example, when, with a first block referencing a second block and this second block referencing a third block, the third block itself references this first block.

All these blocks thus belong to the same cycle and should be stored in order to allow them to be processed by a processing device.

These blocks are also transferred as a whole into the second group NV.

In practice, as illustrated in FIG. 1B, the sorting algorithm commences by identifying all the blocks of the first group V not referencing any other block of this group.

To do that, an obtaining step E31 makes it possible to obtain the first information block of the group V.

It is verified, in a test step E32, whether this first block references another block of the group V.

If not, this block is marked with a mark equal to 1, in a marking step E33.

Then, in a step E34, the following block of group V is examined, if it exists.

An obtaining step E35 makes it possible to obtain this following block on which the steps E32 to E35 are reiterated.

If, on completion of the test step E32, the current block references another block, the algorithm passes directly to the following block of group V, without marking this block.

On completion of these steps E31 to E35, all the blocks not referencing any other block have been identified. These blocks are marked with the mark 1.

When all the blocks of the group V have been examined, the following steps of the sorting algorithm make it possible to climb back up the reference links from the previous identified blocks.

The algorithm consists in marking each block with a number of references to be traveled in order to go from this block as far as a block not referencing any other block.

Thus, in an initialization step E36, an index e is initialized at the value 1, and the number of blocks in the group V is associated with a second index n.

Then, in an obtaining step E37, the first information block of the group V is obtained.

It is verified, in a test step E38, whether this current block references an information block marked with the current index e.

If yes, the current block is itself marked with a mark equal to e+1 in a marking step E39.

It is verified, in a test step E40, whether another block exists in the group V, and the following block is obtained in an obtaining step E41.

The steps E38 to E41 are then reiterated on this following block.

If, on completion of the test step E38, the current block does not reference any block marked e, the following block in the first group V is considered directly.

When, on completion of the test step E40, all the blocks of the group V have been examined, the value of the index e is compared to a threshold value equal to 2n.

If this index value e is below 2n, an incrementation E43 is implemented in order to increment the value of the index e by one unit, and the set of steps E37 to E42 are reiterated over the whole of the information blocks of the group V.

Thus, these steps E37 to E42 make it possible to mark each block with the number of references.

By way of example, if a block B3 references B2, this block B2 itself referencing a block B1 which does not reference anything, then the block B3 is marked with an index equal to 3, the block B2 with an index equal to 2 and the block B1 with an index equal to 1.

Furthermore, this marking algorithm will also mark the blocks forming part of a cycle with a mark equal to a high number.

This is because, if a block B3 references a block B2 which itself references a block B1 which does not reference anything and if, furthermore, the block B2 also references the block B3, the marking algorithm described above will mark the block B1 with an index 1, then mark the block B2 with an index 2, then mark the block B3 with an index 3 then again mark the block B2 with an index 4 then the block B3 with an index 5, then the block B2 with an index 6.

By virtue of the test step E42, the marking steps E33 to E41 are implemented as long as the index e has not reached the value 2n corresponding to twice the number n of information blocks stored in the group V.

Thus, the blocks forming part of a cycle (that is to say the blocks referencing at least one another, directly or indirectly) will automatically be marked with a number which is sufficiently high, and least higher than the number n of information blocks stored in the group V.

Then, when these marking steps are terminated, the sorting is actually carried out.

A first transfer step E44 makes it possible to shift the unmarked information blocks into the second group NV.

These unmarked blocks are in fact blocks belonging to a cycle referencing themselves directly or indirectly, without any referencing to other blocks of the document.

A second transfer step E45 is implemented to shift all the blocks the marking index of which is strictly higher than the number n of information blocks in the group V.

Thus all the cycles are transferred into the second group NV.

The only information blocks stored in the group V on completion of the transfer steps E44 and E45 are blocks which do not reference any other block or which do not include any cross reference, direct or indirect, between two blocks.

A sorting step E46 is carried out on the blocks of the group V on the basis of the marks associated with each block, in decreasing marks.

The few examples which follow illustrate, in a way which is not at all limiting, the introduction of this sorting algorithm onto a set of three blocks, as a function of the referencing existing between these blocks.

EXAMPLE 1

B3 References B2 and B2 References B1
  The marking of the blocks is as follows:
  B3 is associated with 3,
  B2 is associated with 2, and
  B1 is associated with 1.
  The blocks B1, B2, B3 remain in the first group V and are sorted in order B3, B2, B1.

EXAMPLE 2

B3 References B2, B3 References B1 and B2 References B1
  The marking of the blocks is as follows:
  B3 is associated with 3,
  B2 is associated with 2, and
  B1 is associated with 1.
  In this case also, the set of blocks remains in the first group V and is sorted into order B3, B2, B1.

EXAMPLE 3

B3 References B2, B2 References B1 and B1 References B3
  These blocks are not marked on completion of the marking algorithm, such that all these blocks are shifted into the second group NV, during the transfer step E44.

EXAMPLE 4

B3 References B2, B2 References B1 and B2 References B3
   B3 is associated with 5,
   B2 is associated with 6, and
   B1 is associated with 1.

In this example, the blocks B3 and B2 are shifted into the second group NV on completion of the transfer step E45, the block B1 being kept in the first group V.

Hence, on completion of this distribution step E11, a document is obtained distributed into two groups of information blocks V and NV, as illustrated in FIG. 4, between those capable of being processed on the fly and those not being capable of being processed on the fly.

In one preferred mode of the invention, the distribution step E11 may further include a step E114 of verification of the action of each block on the internal state of a processing device.

In practice, it is verified, for the set of information blocks stored in the second group NV, and more particularly the information blocks associated with the attribute mU, whether the processing of these information blocks is capable of modifying the internal state of the computer system incorporating a device for processing this document.

This verification can be carried out with the aid of a table storing the name of the opening markers of each block and their capacity to modify or not modify the internal state of the processing device.

If none of these information blocks are suitable for modifying the internal state of the computer system, this set of information blocks is transferred from the second group NV into the first group V.

These information blocks are sorted beforehand according to the same sorting algorithm as that described above by reference to FIG. 1B. All these blocks are then inserted at the start of the first group V on completion of the verification step E114.

Likewise, if a single block of the second group NV corresponds to a processing likely to modify the internal state of the computer system incorporating the device for processing the message, and if this block makes no reference to any other block of the second group NV, the set of information blocks of the group NV can also be transferred from this second group NV into the first group V.

The information blocks of the group NV are sorted beforehand, as described above by reference to FIG. 1B.

The block the processing of which is likely to modify the internal state of the computer system is placed at the end of this second group NV, then the set of blocks of this second group NV is inserted at the start of the first group V, on completion of the verification step E114.

This verification step E114 thus makes it possible to place the information blocks in the first group V if at the very most one of these information blocks is capable of modifying the internal state of the computer system.

It is possible, in fact, to process these information blocks and to stop the processing of the message as a whole if one of these information blocks is not understood by the processing device, without in any way having modified the internal state of the computer system, in such a way that, upon the interruption to the procedure for processing the message, the latter appears not to have been processed by the processing device.

All these steps for dividing the blocks make it possible to place the information blocks in the first group V as much as possible, in such a way that they can be processed on the fly.

This algorithm for separating the information blocks thus makes it possible to minimize the memory space required to process the message.

After this distribution, a creation step E12 is then implemented in order to generate a new message in which the information blocks are scheduled in accordance with the scheduling method of the invention.

In this new message, during an inserting step E13, the second group NV of information blocks, that is to say the set of information blocks having to be processed globally by the processing device, is inserted first of all.

An inserting step E14 is then implemented in order to insert a signaling block into the document forming a separator between the two groups V and NV.

Next, in an inserting step E15, the first group V of information blocks is inserted directly after the signaling block.

Figure 5:
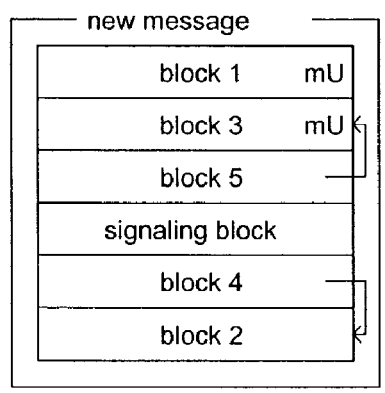

The new message thus created on completion of the scheduling method in accordance with this embodiment is illustrated in FIG. 5.

When this message has to be processed by a processing device of the network, this message is sent in a sending step E16.

Figure 6:
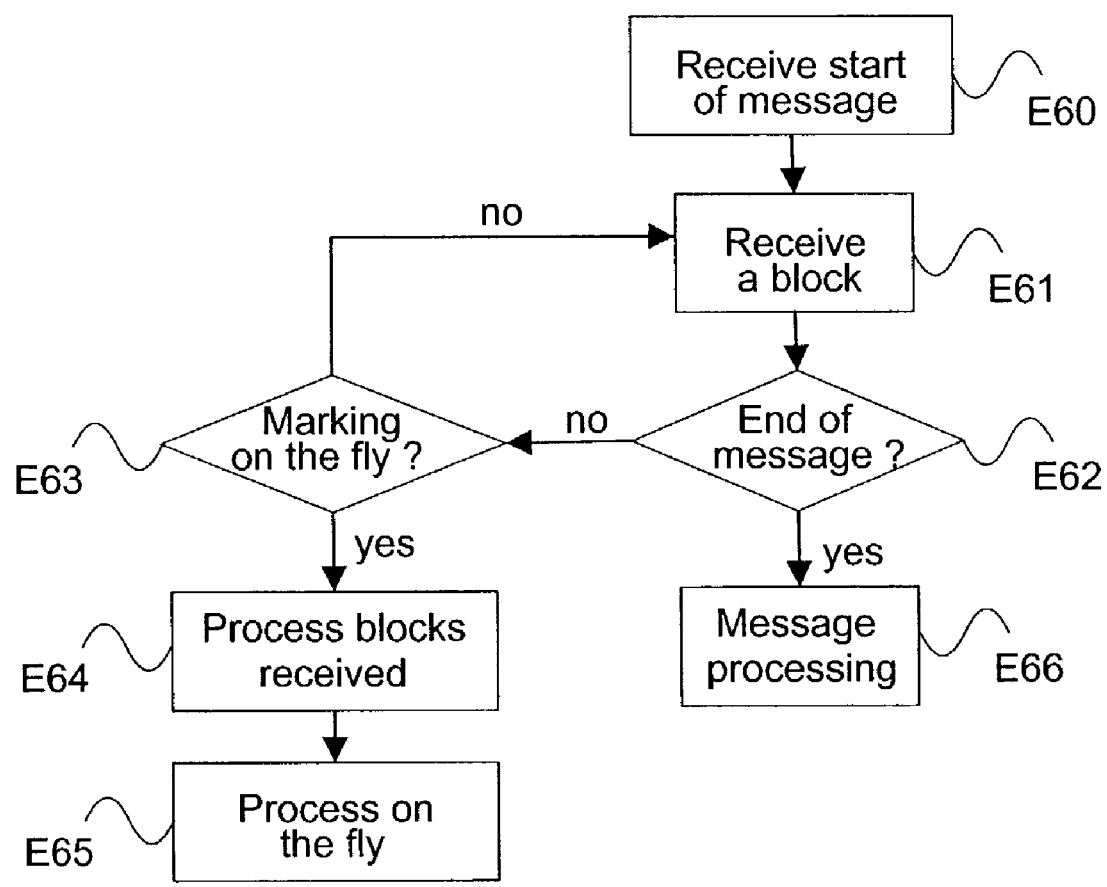
FIG. 6 is an algorithm illustrating a method of processing a document in accordance with one embodiment of the second aspect of the invention.

A method of processing a document represented in a markup language in accordance with the second aspect of the invention will now be described, by reference to FIG. 6.

By way of example, the method of processing a message, as illustrated in FIG. 5, will be described, that is to say a message in which the information blocks have been scheduled in accordance with the scheduling method of the invention.

Thus, a receiving step E60 is implemented so as to receive the is start of the message to be processed.

A step E61 of receiving a first block is then implemented in order to examine the information blocks one by one.

It is first of all verified, in a test step E62, whether this received block forms the end of the message.

If not, it is verified, in a second test step E63, whether the information block received is a predefined signaling block, indicating that the information blocks situated in the message after this marking block can be processed on the fly.

If not, the step E61 of receiving the following information block of the message is implemented, and this is done recursively as long as the information block does not correspond to the predefined signaling block.

Thus, in practice, all the information blocks of the second group NV placed at the header of the message are received.

Thus, by reference to FIG. 5, the blocks 1, 3 and 5 of the message are received, which are stored in memory with a view to their subsequent processing by the processing device.

When the received block is the predefined signaling block, that is to say here the separator block placed between the groups NV and V, a processing step E64 makes it possible to process the information blocks stored by the processing device.

Thus, the set of blocks received previously corresponding to the group NV of information blocks is processed globally, in a conventional way by a device for processing an XML document.

In particular, the set of these information blocks is traversed a first time by the processing device so as to verify whether the latter is suitable for processing all the information blocks bearing the attribute "mustUnderstand".

If one or more information blocks bearing the attributes mU is not understood by the processing device, the processing of the message as a whole is stopped and an error message is generally sent to the computer having sent the message.

Otherwise, the set of blocks of the second group NV is processed globally by the processing device.

Then, in accordance with the invention, as soon as the identification of the predefined signaling block has been carried out at the test step E63, a processing step E65 is implemented in order to process on the fly the information blocks inserted after this predefined signaling block.

Here, the set of blocks 4 and 2 are thus processed, in the order in which they were stored in the first group V of the message as illustrated in FIG. 5.

The end of the message is thus processed in the data stream, as and when the information blocks are received by the processing device.

Needless to say, the message received may possibly not include any signaling block. This is the case especially if the client computer having generated the message does not implement the invention, or else when all the information blocks are stored in the second group NV (or, in other words, the first group V is empty).

In this case, during the processing of the message, the steps E61 to E63 are implemented in a recurrent way. When, on completion of the test step E62, the end of the message is detected, a processing step E66 is implemented in order to process globally the message thus stored in its entirety.

It will be noted, moreover, that the signaling block indicating that the rest of the message can be processed on the fly, is not a block associated with the attribute "mustUnderstand". Thus, a processing device not implementing the processing method in accordance with the second aspect of the invention is nevertheless capable of processing the message sent by a server computer implementing the invention, in which a signaling block has been inserted between the two groups V and NV. It is sufficient for it to ignore the marking block.

This method of processing an XML document can advantageously be implemented directly in a mobile telephone or else in a personal digital assistant such as an on-line diary.

The device for scheduling the XML document is itself to be incorporated into a station of a communications network configured to communicate with a mobile telephone or a personal digital assistant.

By virtue of the incorporation of a signaling block indicating the presence of information blocks capable of being processed in streaming mode in the message, the processing device can process long messages, without requiring a substantial memory space for storing the whole of the message.

When creating such a document comprising several blocks of information, during the inserting steps E13, E15, at least one block of the second group NV and at least one block of the first group V can be inserted respectively before and after the signaling block.

There will be described now, with reference to FIG. 7, a document generation method in accordance with one embodiment of a third aspect of the invention.

As previously, the document to be generated is a document represented in a markup language of the XML type.

Such an XML document thus comes in the form of a message usable by a communication protocol implemented on a network between computers or other communication devices.

This XML document or message comprises a number of information blocks, each information block being delimited by an opening tag and a closing tag and comprising a number of textual data items.

By way of example, a message represented in this way in the XML language is given below:

```
< ?xml version="1.0" ?>
<message>
    <rotate>
        <image>jjm.jpeg</image>
        <angle>90</angle>
    </rotate>
    <ns:decompress mustUnderstand="true"
            xmlns:ns="http://canon.fr">
        <image>jjm.gif.gz</image>
    </decompress>
    <resize>
        <coefficient>4</ coefficient >
    </resize>
</message>
```

In this example, the message has three information blocks, respectively delimited by the tags "rotate", "decompress" and "resize".

The tag "decompress" is furthermore associated with a name-space "ns" identified by an Internet address, for example http://canon.fr, making it possible to uniquely define the tag "decompress".

One or more information blocks of the XML message can be associated with the marker called "mustUnderstand" this marker indicating that it is mandatory to process the information block during processing of the document.

In the example XML message described previously, the predetermined marker is an mU attribute associated with the opening tag "decompress" of the second information block of the message.

Of course, other ways of associating this marker with a block can be used.

Thus, the marker can be a tag included in an information block.

The document would then appear as follows:

```
<block>
    <mustUnderstand value="true"/>
    . . .
</block>
```

Alternatively, the marker can also be a tag defining an information block itself included in this tag.

In this case, the document would appear as follows:

```
<mustUnderstand value="true"/>
    <block>
        . . .
    <block>
</mustUnderstand>
```

Whatever the representation chosen, it makes it possible to associate, with an information block, a marker "mustUnderstand" indicating that it is mandatory to process this information block during processing of the document.

Figure 7:
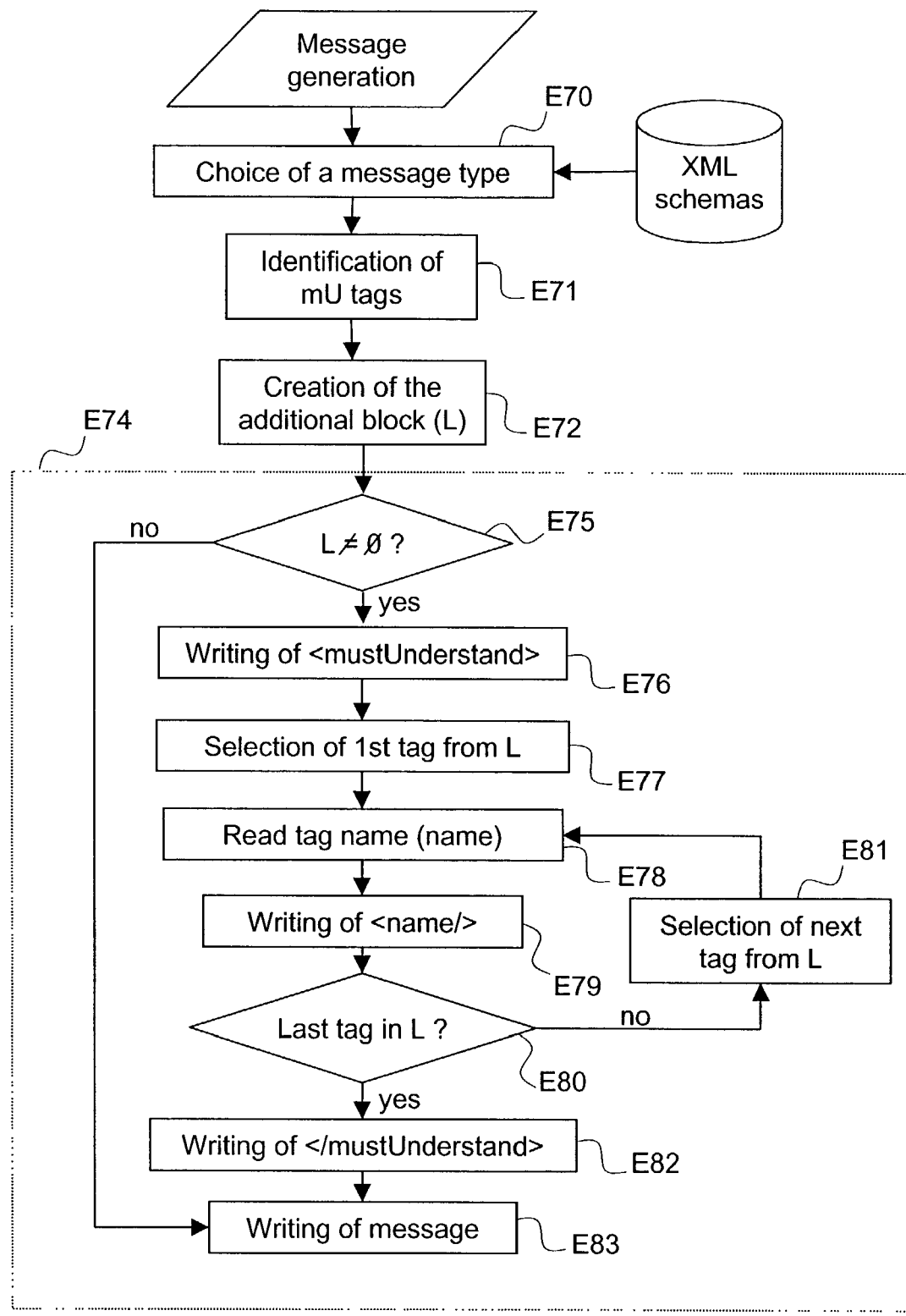
FIG. 7 is an algorithm illustrating the generation method in accordance with one embodiment of the third aspect of the invention.

As illustrated in FIG. 7, during generation of the document, at least one reference associated with an information block will be identified, this reference being associated with the predetermined marker, here the marker "mustUnderstand".

This identification step can be carried out on the XML document already created or else at the actual time of generating the XML document.

Here, this identification step is implemented on an XML schema adapted to define the structure of the XML document it is wished to generate subsequently.

In fact, there can be associated, with an XML document, an XML schema that, itself written in XML language, defines the type structure of a document, that is to say the name of the tags used in this document, their attribute, and the type of values taken by the tags or the attributes.

By way of example, an XML schema corresponding to the XML document described previously would be as follows:

```
<xs:schema targetNamespace="http://canon.fr">
    <xs:element name="message">
        <xs:complexType>
            <xs:element name="rotate">
                <xs:complexType>
                    <xs:element name="image" type="xsi:anyURI"/>
                    <xs:element name="angle" type="xsi:integer"/>
                </xs:complexType>
            </xs:element>
            <xs:element name="decompress">
                <xs:complexType>
                    <xs:attribute name="mustUnderstand"
                        type="xsi:boolean" value="true"/>
                    <xs:element name="image" type="xsi:anyURI/>
                </xs:complexType>
            </xs:element>
            <xs:element name="resize">
                <xs:complexType>
                    <xs:element name"coefficient"
                        type="xsi:integer"/>
                </xs:complexType>
            </xs:element>
        <xs:complexType>
</xs:schema>
```

In practice, the message generation method will have a first step of choosing E70 a message type, for example from a set of stored XML schemas.

From the chosen XML schema, an identification step E71 identifies the references of the information blocks associated with a "mustUnderstand" attribute.

In practice, in the XML schema described previously, there will be identified the tag <xs:element name="decompress">associated with the attribute "mustUnderstand", the value of which is "true".

The reference thus identified can consist of the name of the tag "decompress" associated with this information block.

Advantageously, this reference can comprise, in XML language, not only the name of the tag but also its associated namespace, thus making it possible to uniquely define the identified tag.

Here, from the XML schema, the namespace and the name of the tag to be written into the list of references would be "ns:decompress".

A creation step E72 is next implemented in order to create an additional information block L. This block consists of the list of references identified previously.

Of course, although a single reference was identified in the example described previously, this list can comprise a number of references.

Furthermore, this list can also be empty.

A writing step E74 next writes this additional information block L at the beginning of the message to be generated, and then writes the other information blocks of the document after this additional information block L.

In practice, a test step E75 checks whether this list L is non-empty.

If this list L is empty, the creation step E74 continues with the writing of the message in a conventional manner, that is to say the writing of all the information blocks in the XML language, using the opening and closing tags defining the information blocks.

This writing of the XML document from a predetermined XML schema does not need to be described in more detail here.

On the contrary, if the additional information block L contains at least one reference, there is written, in a step E76, an opening tag defining the start of the additional block to be written:

<mustUnderstand>

There is next selected, in a selection step E77, the first reference stored in the additional information block L.

Here, this first reference is the name of the tag "decompress".

A reading step E78 reads the name "name" of the tag.

A writing step E79 next writes, in a conventional manner, the name of this tag in the information block "mustUnderstand":

<name/>

A check is made, in a test step E80, as to whether this current tag is the last tag in the block L.

If the answer is no, the next tag in the additional information block L is selected in a selection step E81, and the set of steps E78 to E80 is reiterated for this tag.

When all the tags in the block L have been examined and written, a writing step E82 writes the closing tag of the additional information block, in the form:

</mustUnderstand>

This additional information block thus lists all the names of the tags associated with an information block comprising the attribute "mustUnderstand".

A writing step E83 is then implemented in order to write, after this additional information block L, all the information blocks constituting the document to be generated.

By way of example, the XML document described previously appears in the following form, after implementation of the generation method in accordance with the invention:

```
< ?xml version="1.0" ?>
<message>
    <mustUnderstand>
        <decompress/>
    </mustUnderstand>
    <rotate>
        <image>jjm.jpeg</image>
        <angle>90</angle>
    </rotate>
    <ns:decompress mustUnderstand="true"
            xmlns:ns="http://canon.fr">
        <image>jjm.gif.gz</image>
    </decompress>
    <resize>
        <coefficient>4</ coefficient>
    </resize>
</message>
```

This message thus appears in the form of a document comprising information blocks, a first information block comprising a list of references of information blocks of the document, these referenced information blocks being associated with a marker indicating that it is mandatory to process the information block during processing of the document.

The message thus generated on a server station or a computer on a communication network is next transferred to a processing device incorporated for example in another computer on the communication network, or else in a mobile telephone or a personal digital assistant, with a view to the processing thereof.

Figure 8:
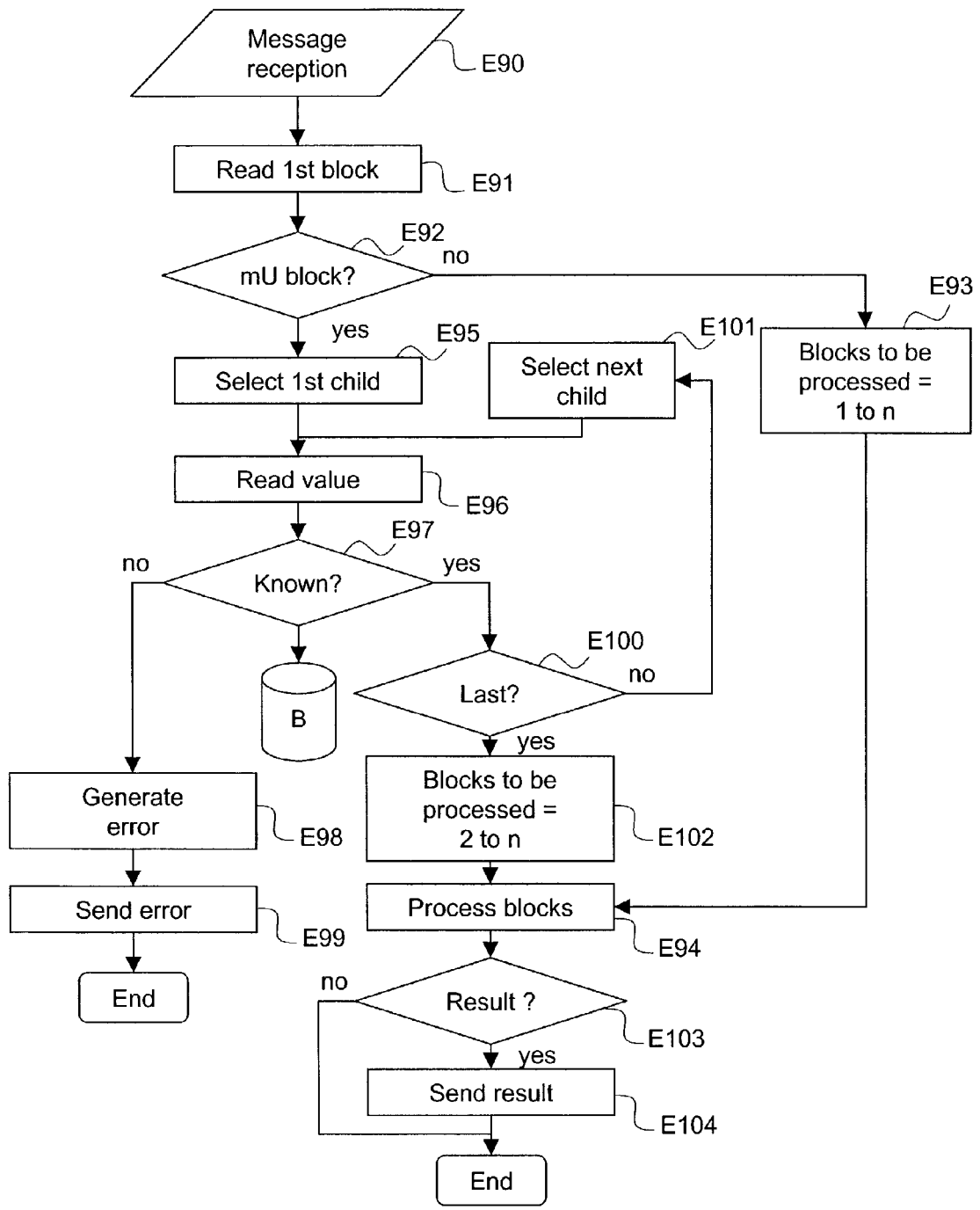
FIG. 8 is an algorithm illustrating a processing method in accordance with one embodiment of the fourth aspect of the invention.

There will now be described, with reference to FIG. 8, the processing of such a message generated by the generation method in accordance with the fourth aspect of the invention.

A receiving step E90 thus first of all receives the message to be processed.

A reading step E91 consists of reading the first information block received.

It may be noted in this respect that the message can be received and processed block by block, in order to minimize the memory space necessary for processing the whole of the message.

A check is made, in a test step E92, as to whether this first block is a "mustUnderstand" block, that is to say whether it corresponds to the additional information block added during generation of the message.

If the answer is no, a step E93 lists all the blocks to be processed of the message, that is to say here, all the blocks of the message.

A processing step proper E94 is implemented in a conventional manner on these information blocks of the message.

If, at the end of the test step E92, the first information block received is indeed a "mustUnderstand" block, a check is made, for each reference stored in this block, that the processing device is indeed adapted to process the information block corresponding to this reference.

For this, there is selected, in a selection step E95, the first child of this "mustUnderstand" block, that is to say here, the first tag name stored.

Here, the tag <decompress/> is selected.

A reading step E96 reads the value "decompress".

A test step E97 checks whether this tag is indeed known to the processing device, and in particular whether said device is adapted to process said tag.

This test step can be implemented from a table B storing all the tag names that the processing device is adapted to process.

When the tag read at the reading step E96 is not known to the processing device, at the end of the test step E97, a step of generating E98 and sending E99 an error indicates that the processing device is not adapted to process the received message.

This error message can be sent to the server device that generated and transferred the message, or else even appear on a screen of the processing device, when the latter for example is a mobile telephone, in order to indicate to the user that it was impossible to process the received message.

If, at the end of the test step E97, the current tag read is indeed known to the processing device, a check is made, in a test step E100, as to whether the selected child is the last in the "mustUnderstand" block.

If the answer is no, the next child is selected in a selection step E101, and the steps E96 to E100 are reiterated on this child.

When, at the end of the test step E100, all the children in the "mustUnderstand" block have been processed, there are identified, in an identification step E102, all the blocks of the message to be processed, that is to say here, all the blocks of the message except the first additional block already analyzed.

A processing step E104 can then be implemented in a conventional manner on these blocks to be processed identified at the identification step E102, without having to read all these blocks in order to check that the processing device is indeed adapted to process them.

By virtue of the invention, the processing of the information blocks of the document can thus be carried out as they are being read, as soon as the additional information block, placed at the beginning of the message, has been checked as described previously.

Conventionally, this processing method can include a test step E103 for checking whether the processing of the document produces a result. If the answer is yes, a sending step E104 sends this result by means of the computer that transferred the message or else displays this result for the user of the processing device.

Figure 9:
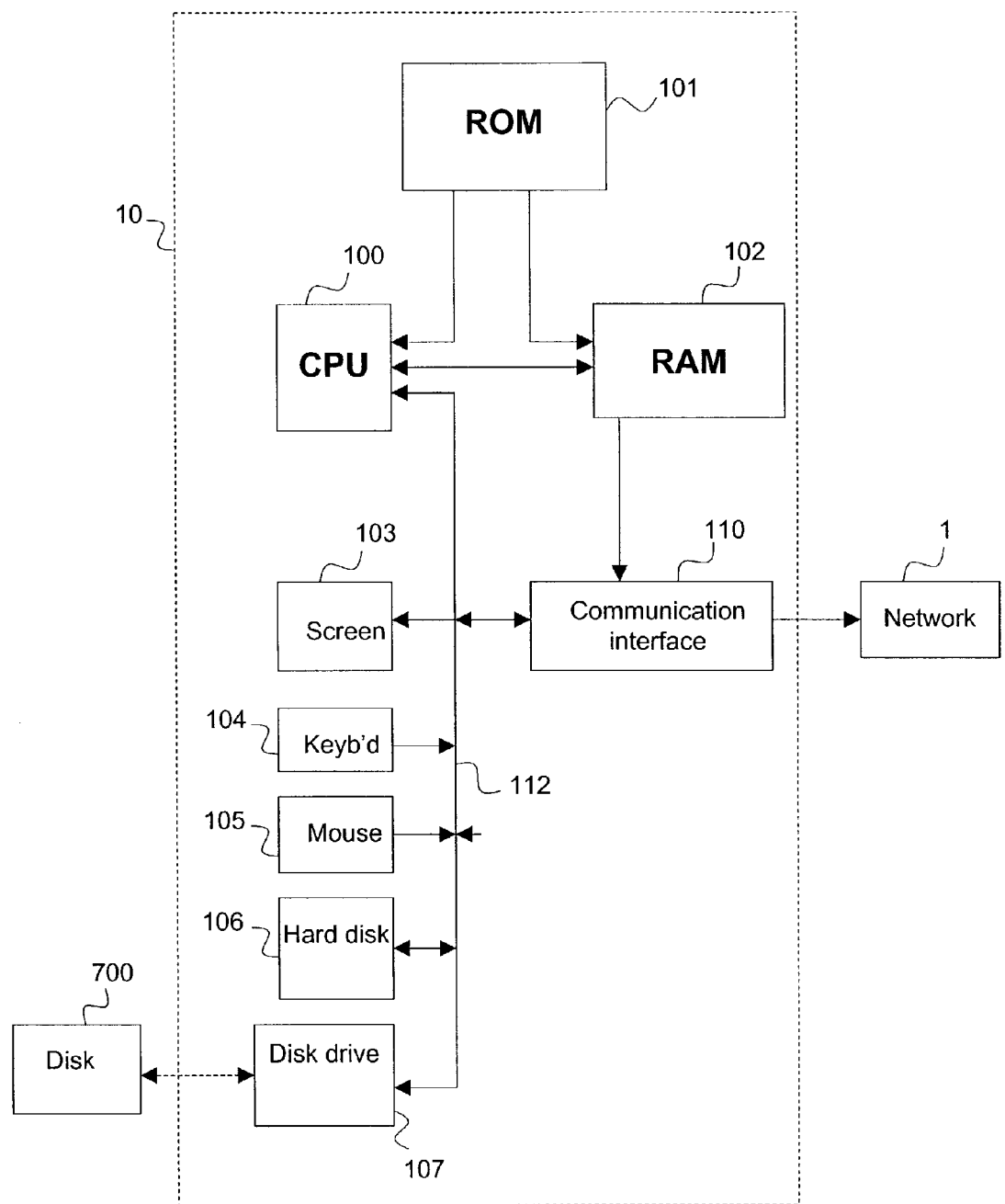
FIG. 9 illustrates schematically a computer system adapted to implement the various methods of the invention.

One or other of these computer systems suitable for implementing the scheduling, the creating, the generation and/or processing methods in accordance with the invention is illustrated diagrammatically in FIG. 9.

The scheduling device, the generation device, and the processing devices according to the second or fourth aspect of the invention on the other hand, can be incorporated into a microprocessor 100, a read-only memory or ROM 101 comprising a program for scheduling a document, generating a document or processing documents, and a random-access memory or RAM 102 including registers configured to store variables modified in the course of the running of the program.

In particular, the random-access memory 102 of the scheduling device is configured to store all the blocks of the message as well as the indices e and n which are necessary for the sorting of the information blocks in the first group V.

Likewise, the random-access memory 102 of the processing device according to the second aspect of the invention is sufficient for storing all the information blocks received before the reception of the signaling block indicating the possibility of processing the following blocks on the fly as they are received, without having to store them in memory.

In document processing device in accordance with the fourth aspect of the invention, the random access memory 102 comprises registers adapted to store the first block of the document as well as the table B listing all the information blocks known to the processing device.

Alternatively, the document generation device has a random access memory 102 comprising registers adapted to store the list L of references of identified information blocks for creating the additional information block to be inserted at the beginning of the message.

This microprocessor 100 is integrated with a computer 10 which can be connected to various peripheral devices or else be incorporated in a mobile telephone, or else in a personal digital assistant (PDA) such as a connected organizer.

This computer 10 includes a communication interface 110 linked to the communications network 1 in order to receive or transmit documents such as messages written in XML language.

The computer 10 further includes document-storage means, such as a hard disk 106, or is configured to co-operate by means of a disk drive 107 (diskettes, compact discs or computer cards) with removable document-storage means, such as discs 700.

These fixed or removable storage means may further include the code of the scheduling or processing method in accordance with the invention which, once read by the microprocessor 100, will be held on the hard disk 106.

By way of a variant, the program allowing the scheduling, the generation or processing device to implement the invention may be stored in the read-only memory ROM 101.

In a second variant, the program may be received so as to be held as described above by way of the communication network 1.

The computer 10 also comprises a screen 103 allowing it, for example, to serve as interface with an operator by the use of the keyboard 104 or of the mouse 105 or of any other means, and to display data of the XML document after it has been processed.

The central-processing unit (CPU) 100 will execute the instructions relating to the implementation of the invention. When power is applied, the programs and methods relating to the invention held in a non-volatile memory, for example the read-only memory 101, are transferred into the random-access memory 102 which will then contain the executable code of the invention as well as the variables necessary for the implementation of the invention.

The communication bus 112 allows communication between the various sub-elements of the computer 10 or those linked to it. The representation of the bus 112 is not limiting, and, in particular, the microprocessor 100 is capable of communicating instructions to any sub-element directly or by way of another sub-element.

Needless to say, numerous modifications can be applied to the embodiment described above without departing from the scope of the invention.

Thus, although the scheduling method described above is implemented on a document already represented in XML language, this scheduling method can also be implemented in order to generate a document in XML language, even during its creation.

Furthermore, the association of the attribute mU with an information block may take place not only by way of an attribute associated with an opening tag defining the information block, as described in the embodiment, but also by virtue of a tag included in the information block or else by virtue of an encompassing tag, in which the information block is included.

The generation method has been described in its implementation from an XML schema used for generating an XML document.

This generation method could also be implemented on a representation in the form of computer objects or blocks of the document to be generated subsequently.

This representation can be made in the form of a tree, listing the different blocks and their respective hierarchical position, or else in the form of a table.

By way of example, the following table, corresponding to the XML document of the preceding example, could be used for identifying the references to be written into the additional information block.

|    | Name       | Block     |       |           |
| -- | ---------- | --------- | ----- | --------- |
|    | rotate     | B1        |       |           |
|    | decompress | B2        |       |           |
|    | resize     | B3        |       |           |
| B1 | Name       | Value     | Type  |           |
|    | image      | jjm.jpeg  | tag   |           |
|    | angle      | 90        | tag   |           |
| B2 | Name       | Value     | Type  |           |
|    | image      | jjm.gif.gz | tag  |           |
|    | mustUnderstand | true  | attribute |       |
| B3 | Name       | Value     | Type  |           |
|    | coefficient | 4        | tag   |           |

To each block B1, B2 and B3 there corresponds a table referencing the tags and attributes of this block.

The identification step can be implemented from these tables, by identifying the blocks, here the block B2 ("decompress"), associated with the particular attribute "mustUnderstand".

In a general manner, the present invention relates to any document comprising several blocks of information and it is not limited to document represented in a markup language.

The invention claimed is:

1. A method of processing a document that includes juxtaposed information blocks, comprising:

a step of scheduling the document, which includes a step of dividing the information blocks into two groups, a first group of the two groups including information blocks of the document that can be processed in streaming mode, and a second group of the two groups including information blocks of the document not in the first group, wherein the step of dividing includes:

identifying at least one information block associated with a predetermined attribute, the predetermined attribute indicating a mandatory processing of the information block when the document is processed;

writing the identified information block into the second group;

identifying a set of information blocks associated with the predetermined attribute in the second group, wherein processing of the set of information blocks is not suitable for modifying an internal state of a computer system incorporating a device for processing the document; and transferring the identified set of information blocks associated with the predetermined attribute of the second group into the first group;

a step of inserting the divided information blocks into the document, wherein the step of inserting includes:

inserting the second group of information blocks into the document;

inserting a signaling block into the document; and inserting the first group of information blocks after the inserted signaling block; and a step of processing the document, including:

identifying the signaling block; and streaming processing the first group of information blocks after the signaling block, wherein the first group is not stored in a memory of the device.

2. The method as claimed in claim 1, wherein the step of dividing further includes:

identifying a first information block referencing a second information block; and writing the first information block into the second group if the second information block belongs to the second group.

3. The method as claimed in claim 1, wherein the step of dividing further includes:
identifying a first information block referencing a second information block; and
writing the first information block before the second information block if the second information block belongs to the first group.

4. The method as claimed in claim 1, wherein the step of dividing further includes:
identification of at least two information blocks referencing one another, directly or indirectly; and
writing the information blocks into the second group.

5. The method as claimed in claim 1, further comprising the steps of:
identifying at least one reference associated with an information block, the reference being associated with a marker indicating that it is mandatory to process the information block during processing of the document;
creating an additional information block, comprising a list of identified references; and
writing, at the beginning of the document, the additional information block, and writing the information blocks of the document after the additional information block.

6. The method as claimed in claim 5, wherein, in the step of identifying, the predetermined marker is an attribute associated with a tag of an information block.

7. The method as claimed in claim 5, wherein, in the step of identifying, the predetermined marker is a tag included in an information block.

8. The method as claimed in claim 5, wherein, in the step of identifying, the predetermined marker is a tag defining an information block.

9. The method as claimed in claim 5, wherein the step of identifying is implemented on an XML schema to define a structure of an XML document.

10. The method as claimed in claim 5, wherein, in the step of creating an additional information block, the references in the list include names of tags associated with the information blocks.

11. A computer storage medium, totally or partially removable, readable by a computer system, the medium storing instructions of a computer program to implement the method as claimed in claim 5, when the computer program is loaded in and run by the computer system.

12. A device for processing a document that includes juxtaposed information blocks, comprising a memory and a processor that includes:
means for scheduling the document that includes means for dividing information blocks into two groups, a first group of the two groups including information blocks that can be processed in parallel, and a second group of the two groups including information blocks of the document not in the first group, wherein the means for dividing includes:
means for identifying at least one information block associated with a predetermined attribute, the predetermined attribute indicating a mandatory processing of the information block when the document is processed;
means for writing the identified information block into the second group;
means for identifying a set of information blocks associated with the predetermined attribute in the second group, wherein processing of the set of information blocks is not suitable for modifying an internal state of a computer system incorporating a device for processing the document; and
means for transferring the identified set of information blocks associated with the predetermined attribute of the second group into the first group;
means for inserting the divided information blocks into the document, wherein the means for inserting includes:
means for inserting into the document the second group of information blocks;
means for inserting into the document a signaling block; and
means for inserting into the document the first group of information blocks after the inserted signaling block; and
means for processing the document, including:
means for identifying the signaling block; and
means for streaming processing the first group of information blocks after the signaling block, wherein the first group is not stored in the memory of the device.

13. The device as claimed in claim 12, wherein the means for dividing further includes:
means for identification of a first information block referencing a second information block; and
means suitable for writing the first information block into the second group if the second information block belongs to the second group, or suitable for writing the first information block before the second information block if the second information block belongs to the first group.

14. The device as claimed in claim 12, which is incorporated into a system that includes:
a microprocessor;
a read-only memory adapted to store a program for scheduling the document; and
a random-access memory including registers adapted to store variables modified during execution of the program.

15. A mobile telephone, which includes the device as claimed in claim 12.

16. A personal digital assistant, which includes the device as claimed in claim 12.

17. A computer system, which includes the device as claimed in claim 12.

18. The device as claimed in claim 12, further comprising:
means for identifying at least one reference associated with an information block, the reference being associated with a marker indicating that it is mandatory to process the information block during processing of the document;
creation means to create an additional information block that includes a list of identified references; and
writing means to write the additional information block at the beginning of the document and to write the information blocks of the document after the additional information block.

19. The device as claimed in claim 18, the device being incorporated in a system that includes:
a microprocessor;
a read only memory adapted to store a program for generating a document; and
a random access memory including registers adapted to store variables modified during execution of the program.

20. A mobile telephone, which includes the device as claimed in claim 18.

21. A personal digital assistant, which includes the device as claimed in claim 18.

22. A computer system, which includes the device as claimed in claim 18.

23. A computer storage medium, wholly or partly removable, readable by a computer system, the medium storing instructions of a computer program to implement the method as claimed in claim 1, when the computer program is loaded and executed by the computer system.

* * * * *